(12) United States Patent
Rollett

(10) Patent No.: US 11,641,963 B2
(45) Date of Patent: May 9, 2023

(54) BEVERAGE HOLDER AND METHOD

(71) Applicant: Alexander Rollett, Moreno Valley, CA (US)

(72) Inventor: Alexander Rollett, Moreno Valley, CA (US)

(*) Notice: Subject to any disclaimer, the term of this patent is extended or adjusted under 35 U.S.C. 154(b) by 157 days.

(21) Appl. No.: 17/173,562

(22) Filed: Feb. 11, 2021

(65) Prior Publication Data
US 2022/0248884 A1 Aug. 11, 2022

(51) Int. Cl.
*A47G 23/02* (2006.01)
*A01N 65/24* (2009.01)
*A01N 65/22* (2009.01)

(52) U.S. Cl.
CPC .......... *A47G 23/0216* (2013.01); *A01N 65/22* (2013.01); *A01N 65/24* (2013.01)

(58) Field of Classification Search
CPC .... A01N 65/22; A01N 65/24; B65D 81/3876; A01M 29/12; A47G 23/0216; A47G 2023/0283; A47G 2023/0291
See application file for complete search history.

(56) References Cited

U.S. PATENT DOCUMENTS

| | | | | |
|---|---|---|---|---|
| 2,979,301 | A * | 4/1961 | Reveal | A47G 23/0216 220/737 |
| 5,209,367 | A * | 5/1993 | Van Musscher | G09F 3/04 229/87.01 |
| 5,842,633 | A * | 12/1998 | Nurse | B65D 81/3886 220/737 |
| 5,857,615 | A * | 1/1999 | Rose | A47G 23/0216 428/162 |
| 6,093,413 | A * | 7/2000 | Matson | A01N 43/90 424/407 |
| 7,263,790 | B2 * | 9/2007 | Richards | B65D 25/36 24/593.1 |
| 8,092,072 | B2 * | 1/2012 | Parias Cruz | B01F 27/88 366/248 |
| 8,668,109 | B2 * | 3/2014 | Dickert | B65D 81/3876 220/737 |
| 11,134,672 | B1 * | 10/2021 | Warren | H02J 7/35 |
| 11,297,823 | B1 * | 4/2022 | Carter | A01M 29/12 |
| 2004/0216367 | A1 * | 11/2004 | Klein | A01M 1/2011 43/114 |
| 2005/0056654 | A1 * | 3/2005 | Leung | B65D 81/3876 220/737 |
| 2012/0315317 | A1 * | 12/2012 | O'Hara | A01N 25/34 54/6.1 |
| 2013/0095162 | A1 * | 4/2013 | Quinn | A01N 25/08 424/409 |
| 2015/0329798 | A1 * | 11/2015 | Koenig | A01N 65/12 604/360 |
| 2016/0242405 | A1 * | 8/2016 | Zhang | A01N 65/22 |
| 2020/0189831 | A1 * | 6/2020 | Berthelot | A47G 23/0266 |
| 2020/0221686 | A1 * | 7/2020 | Kawabata | A01M 29/12 |
| 2020/0339313 | A1 * | 10/2020 | DiDato | A47G 19/2266 |
| 2021/0038754 | A1 * | 2/2021 | Elman | A01N 25/34 |
| 2021/0251212 | A1 * | 8/2021 | Rubel | A01M 29/12 |
| 2021/0289774 | A1 * | 9/2021 | Anderson | A01N 37/18 |
| 2022/0015349 | A1 * | 1/2022 | Toon, Jr. | A01M 29/12 |

FOREIGN PATENT DOCUMENTS

KR WO2017179764 * 10/2017

* cited by examiner

*Primary Examiner* — Don M Anderson
(74) *Attorney, Agent, or Firm* — Fish & Richardson P.C.

(57) ABSTRACT

An improved beverage holder for supporting a beverage or beverage container while also providing pest repellant properties.

6 Claims, 3 Drawing Sheets

BEVERAGE HOLDER AND METHOD

TECHNICAL FIELD

This disclosure relates to a beverage holder, and in some implementations, a beverage holder having insect pest repellant feature and its method of use.

BACKGROUND

Beverages are often consumed in a variety of environments, including outdoors, in restaurants and bars, or while traveling or commuting. Some beverage containers may include an optional beverage holder, such as a cardboard sleeve or other removable cover, to provide additional insulation from a hot or cold beverage during transport or consumption. For example, coffee is often served in a paper or plastic-coated container along with a cardboard sleeve to protect the user's hand from the hot coffee.

Some beverage containers may include an open top where the beverage is exposed to the surrounding air. In other instances, beverage containers may have a removable top, should the user prefer to enjoy the beverage without a lid. In some cases, the aroma of the beverage, whether in a container with a top or open surface, may allow the aroma and scent of the beverage to permeate the area around the user. This may provide a desirable aroma to the user while consuming the beverage, but this aroma may also attract unwanted pests, such as flies or other insects, which may be undesirable.

SUMMARY

Some embodiments described herein include an improved beverage holder that includes a pest repellent layer, such as a coating deposited along at least a portion of the holder, to allow the user to enjoy their beverage while decreasing the likelihood that the user is disturbed by pests, such as insects and arthropods. Accordingly, even when such pests may be otherwise drawn to a beverage or attempt to climb upon the surface of a beverage container, the beverage holder can increase the likelihood of repelling the pests, thereby aiding the user in avoiding such insects or other pests that may be distracting and annoying to the user trying to consume a beverage. Additionally, the beverage holder can be configured to increase the likelihood of repelling from the user's beverage insects that may carry insect-borne diseases, such as malaria, Lyme disease, and the like. Further, some methods described herein can beneficially reduce the amount of waste that might otherwise occur when a user decides to cease consumption of his or her beverage (or return it for a replacement) due to one or more pests entering into the beverage container.

In some embodiments, an improved beverage holder may comprise a beverage holder configured to repel insects and other pests from approaching or landing on the beverage container. The improved beverage holder may optionally include a sleeve that is attached to or slid over another beverage container, such as, for example, a cardboard sleeve for sliding onto a coffee cup. In other embodiments, an improved beverage holder may comprise a beverage container, such as a paper coffee cup having a coating or layer of insect repellent on at least a portion of the beverage container. In still further embodiments, an improved beverage holder may comprise an adjustable sleeve to allow the beverage holder to be placed on a variety of beverage containers of different sizes and shapes.

Optionally, the improved beverage holder may comprise a pest repellent portion disposed on the beverage holder. For example, the beverage holder may comprise in some implementations a cardboard sleeve with a coating of pest repellent. In other implementations, the pest repellent may be infused into a porous material comprising the beverage holder. For example, the beverage holder may be constructed from chip board or particle board infused with pest repellent. In still further implementations, an improved beverage holder may comprise a supporting portion (such as, for example, a cardboard cylinder), with a second, pest repellant portion. Optionally, the pest repellant portion may comprise a second piece of material, such as a strip or layer of cardboard or chip board, inset into or placed on top of the supporting portion.

In some embodiments, an improved beverage holder may comprise an adjustable sleeve for attachment to a variety of different sizes and shapes of beverage container. For example, in some embodiments, the improved beverage holder may comprise a strip having a tab and a variety of corresponding slots. In such embodiments, the user may adjust the overall length of the beverage holder to fit their beverage container by placing the tab in an appropriate slot on the beverage holder. In some implementations, the slots may comprise open ended cut-outs in the beverage holder. In other implementations, the beverage holder may comprise a plurality of slots in the body of the beverage holder, and a corresponding tab that is configured to fit into one of the plurality of slots, depending on the size of the user's beverage container. In still further embodiments, the improved beverage holder may comprise other fasteners, such as a loop configured to engage with a plurality of buttons or tacks on the beverage holder.

In some implementations, the improved beverage holder may comprise a pest repellant portion having a non-toxic pest repellant composition, such as one that is generally recognized as safe (GRAS). For example, some optional implementations of the pest repellant portion may include a safely edible pest repellent composition comprising a plant compound, such as cinnamon, wintergreen, or peppermint extract, in an amount sufficient to achieve a selected potency of pest repellant while avoiding an unpleasant odor that interferes with the user's enjoyment of the beverage. As such, in those optional implementations, the pest repellant portion is a "toxic-free" structure that achieves the pest repellant characteristics without toxic compositions (e.g., diethyltoluamide (DEET)) or known carcinogens.

Particular embodiments described herein include a beverage sleeve adapted for attachment to a beverage container. Some embodiments may include an annular wall having an outer surface, an inner surface shape to frictionally engage with an exterior side surface of a beverage container, and a pest repellant portion positioned to emit a pest repellant composition outwardly from the outer surface when the inner surface frictionally engages the beverage container. Optionally, in some embodiments, the pest repellant portion includes a pest repellant solution comprising water and at least one plant compound, said plant compound being an insect repellent, antifeedant, or oviposition deterrent and generally recognized as safe.

Some embodiments include a system having a beverage container comprising a liquid beverage for consumption. Particular embodiments may include a beverage sleeve adapted for attachment to the beverage container. Optionally, the beverage sleeve may comprise an annular wall having an outer surface, an inner surface shaped to frictionally engage with an exterior side surface of a beverage container, and a pest repellant portion positioned to emit a pest repellant composition outwardly from the outer surface when the inner surface frictionally engages the beverage container. Some embodiments may include a pest repellant portion that includes a pest repellant solution comprising water and at least one plant compound, said plant compound being an insect repellent, antifeedant, or oviposition deterrent and generally recognized as safe.

Some embodiments described herein may comprise a method of repelling pests from a beverage. Optionally, the method may include the step of pouring a liquid beverage into a beverage container. Some embodiments may further include the step of attaching a beverage sleeve to the beverage container. In some implementations, the beverage sleeve comprises an annular wall having an outer surface, an inner surface shape to frictionally engage with an exterior side surface of a beverage container, and a pest repellant portion positioned to emit a pest repellant composition outwardly from the outer surface when the inner surface frictionally engages the beverage container. Optionally, the pest repellant portion includes a pest repellant solution comprising water and at least one plant compound, said plant compound being an insect repellent, antifeedant, or oviposition deterrent and generally recognized as safe. In some embodiments, the method further includes the step of consuming the beverage.

A number of embodiments described herein may provide one or more of the following advantages. First, some embodiments provide a beverage holder for supporting a beverage or a beverage container. Such beverage holders may advantageously provide insulation to a user's hands from a hot or cold beverage within the beverage holder or beverage container. In some embodiments, the beverage holder may be an adjustable sleeve so that a user may place the beverage holder on beverage containers of varying sizes and shapes. Optionally, the beverage holder may be removable so that the user can re-use the beverage holder on multiple beverages or different kinds of beverages. Second, some embodiments provide a beverage holder having a pest repellent. In some embodiments, the pest repellent is placed on the surface of the beverage holder. In other embodiments, the pest repellent may be infused into the material of the beverage holder. Advantageously, such beverage holders discourage the presence of insects and other pests from the vicinity of the beverage or beverage container. Third, in some optional embodiments, the improved beverage holder may comprise a safe, non-toxic pest repellent having an aroma complementary to the user's beverage and that is less likely to contain toxic or carcinogenic materials.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
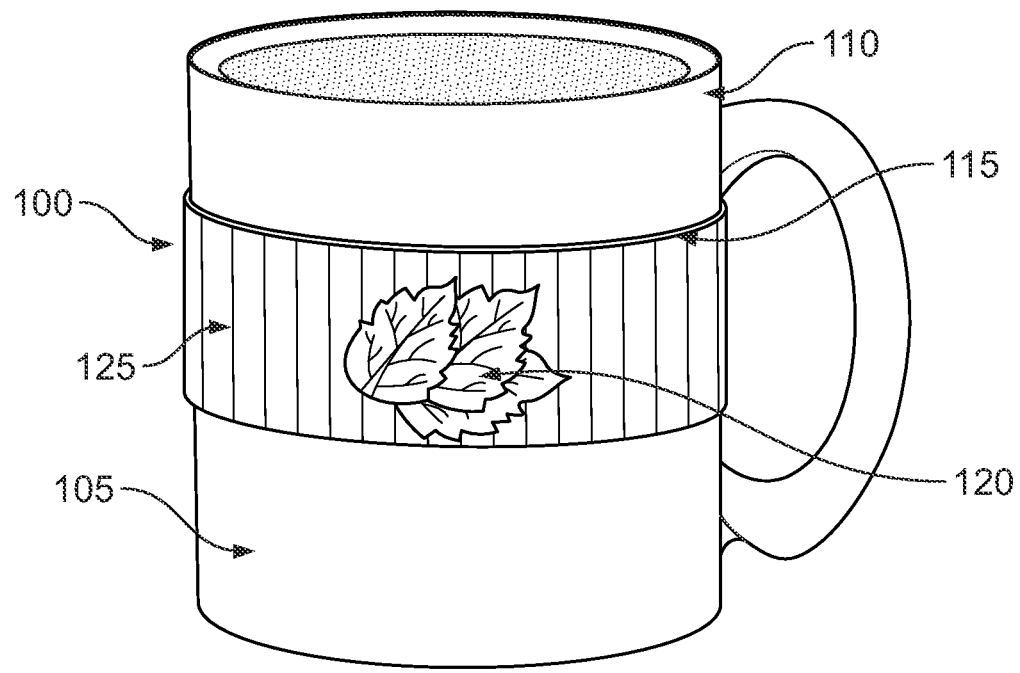
FIG. 1 shows a perspective view of an improved beverage holder.
Figure 2:
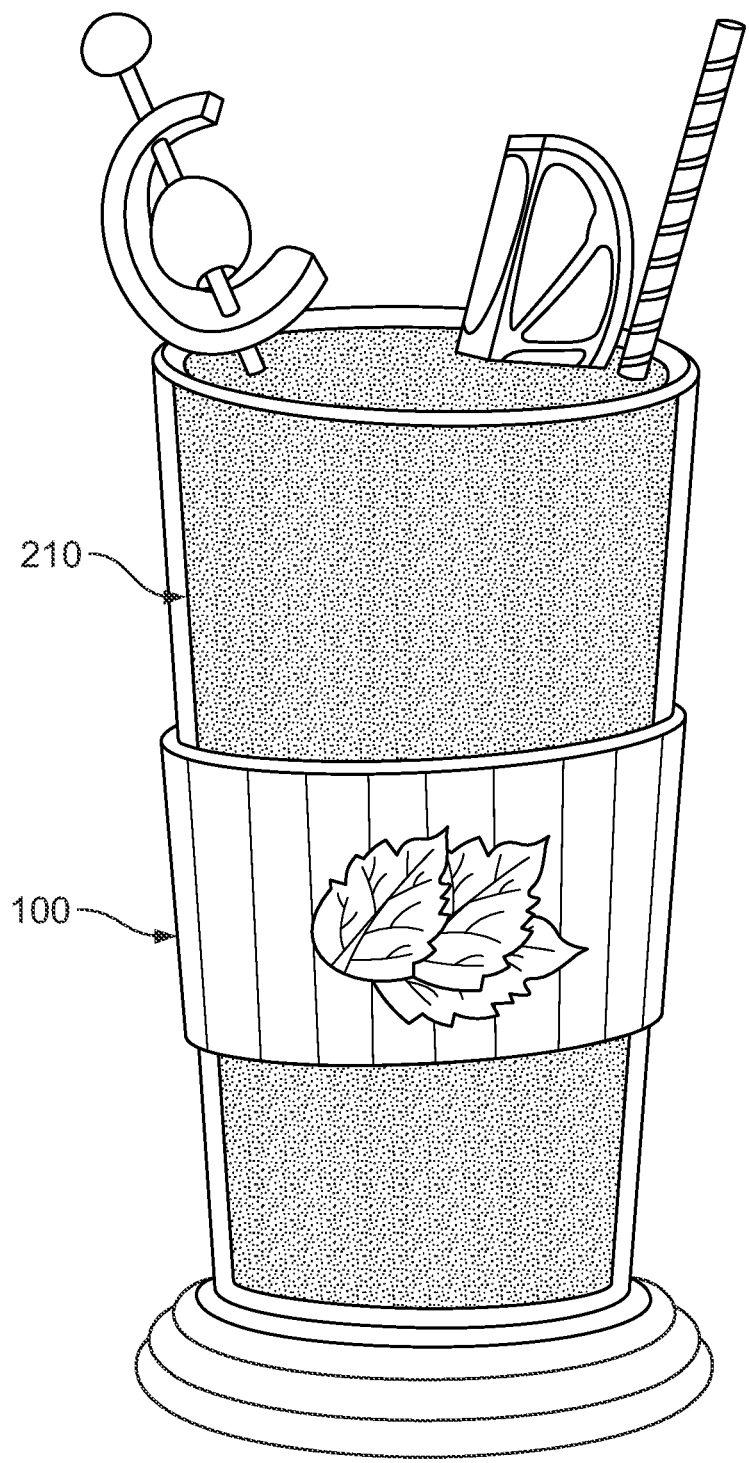
FIG. 2 shows a perspective view of another embodiment of an improved beverage holder.
Figure 3:
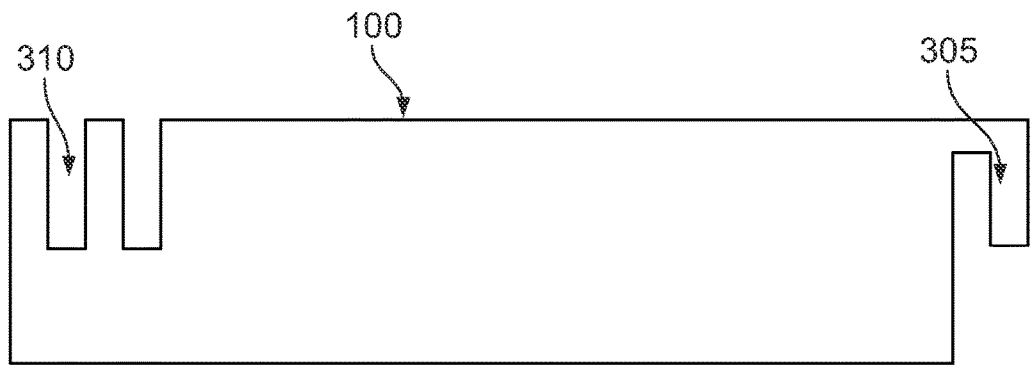
FIG. 3 shows another perspective view of the improved beverage holder of FIG. 1.

Referring now to FIG. 1, some embodiments of a beverage holder 100 are configured to engage with an outer side surface 105 of beverage container 110. In some embodiments, such as shown in FIG. 1, beverage holder 100 may comprise a shape complementary to a side exterior surface of a beverage container, such as cylindrical sleeve that slides around or attaches to the beverage container 110 (or a frusto-conical sleeve as depicted in FIG. 2). In other embodiments (now shown), beverage holder 100 may be in the form of a beverage container itself, such as a cup having a base and a cylindrical sidewall, as opposed to a sleeve for fitting onto a beverage container. Further, in embodiments where beverage holder 100 is in the form of a sleeve, such as the embodiment shown in FIG. 1, the sleeve may have a height that is greater than or equal to 0.5 cm and is shorter than 1cm less than the height of the beverage container. Additionally, the beverage holder 100 is in the form of a sleeve, such as the embodiment shown in FIG. 1, the sleeve may have a thickness of 0.5 mm to 10 mm.

In some embodiments, beverage holder 100 may comprise a material that provides an insulative effect, thereby achieving a holder structure 100 that acts as an insulating layer between outer side surface 105 of beverage container 110 and the user's hand (which would grip or touch beverage holder 100). For example, in some embodiments, beverage holder may include a corrugated cardboard structure so as to provide an insulating effect between the user's hand and beverage container 110. Optionally, a supporting layer 115 of the beverage holder 100 may be constructed entirely from cardboard. In other embodiments, the supporting layer 115 of the beverage holder 100 may be constructed from chip board or other porous wood material. In still further embodiments, the supporting layer 115 of the beverage holder 100 may be constructed from a combination of such or other insulating materials.

In some embodiments, beverage holder 100 may comprise the supporting layer 115 and a pest repellent portion 120 having a composition or properties to repel insects and other pests. As shown in FIG. 1, pest repellent portion 120 may be a separate structure inset into supporting layer 115 so as to be flush with the outermost face of the supporting layer. Alternatively, pest repellent portion 120 may be bonded to the outermost face of supporting layer 115 of beverage holder 100 so as to reside slightly outward from the supporting layer. Although shown as a decorative leaf in FIG. 1, pest repellent portion 120 may be configured with a selected size and shape that enhances the aesthetic appearance of supporting layer 115, including for example, a ring, disc, square, circle, band encircling a portion of supporting layer 115, a logo, or the like.

Optionally, in addition to or as an alternative to the pest repellant portion 120, the beverage holder 100 may further comprise a pest repellant composition embedded within or coated on the supporting layer 115. In some embodiments, an insect repellent composition may be sprayed onto the outer surface 125 of beverage holder 100. In other embodiments, beverage holder 100 may be saturated with the insect repellent composition to as to coat both outer surface 125 and an inner surface of beverage holder 100. In still further embodiments, beverage holder 100 may comprise a porous material, such as, for example, chip board, which may be infused with the insect repellent composition.

In some embodiments, the insect repellent composition may comprise a non-toxic insect repellent that is safe for human consumption when incidentally ingested. For example, in some embodiments, the insect repellent composition may comprise an edible composition comprising a plant compound such as cinnamon, wintergreen, or peppermint extracts. In other embodiments, the insect repellent composition may comprise lemongrass, citronella, tea tree, eucalyptus, or lavender oils or extracts. Alternatively, the insect repellent composition may consist only of one of cinnamon extract, wintergreen extract, peppermint extract, lemongrass oil or extract, citronella oil or extract, tea tree oil or extract, eucalyptus oil or extract, and lavender oil or extract. In a further alternative, the insect repellent composition may consist only of a combination of two or more of cinnamon extract, wintergreen extract, peppermint extract, lemongrass oil or extract, citronella oil or extract, tea tree oil or extract, eucalyptus oil or extract, and lavender oil or extract. In some embodiments, one or more of the above-mentioned extracts or oils may be combined with water or a water based solution for application to beverage holder 100.

As shown in FIGS. 2-5, beverage holder 100 may be configured to provide a selectable diameter so as to frictionally fit with a variety of beverage containers of different sizes and shapes, such as beverage container 110 (of FIG. 1) and beverage container 210 (of FIG. 2). For example, in the optional version depicted in FIG. 3, beverage holder 100 may comprise a tab 305 and a plurality of slots 310. A user may then wrap beverage holder 100 around a beverage container and slide tab 305 into a corresponding slot 310 appropriate for the size of the beverage container to secure beverage holder 100 to the beverage container. This also may allow the user to attach beverage holder 100 to beverage containers containing a handle where beverage holder 100 could not be slid on (such as shown in FIG. 2). Further, a user may optionally remove beverage holder 100 from a beverage container when the user has finished the beverage therein and apply beverage holder 100 to a second beverage container for further use.

Figure 4:
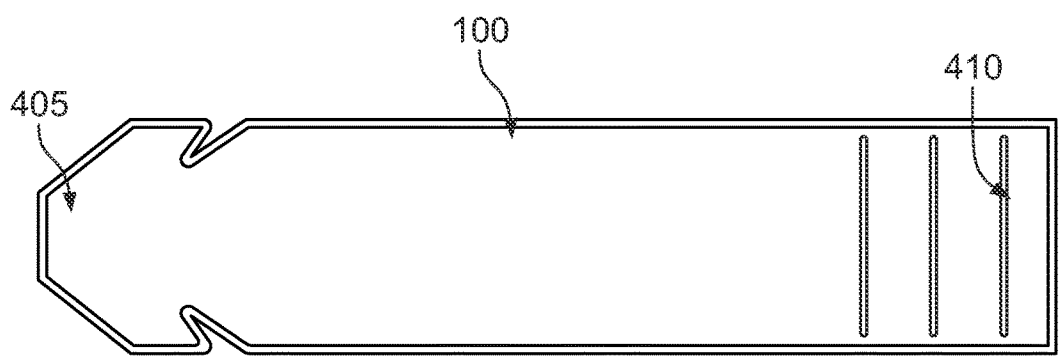
FIG. 4 shows a perspective view of an alternative improved beverage holder.

As shown in FIG. 4, in some alternative embodiments, beverage holder 100 may comprise tab 405 and a plurality of slots 410. Compared to the embodiment shown in FIG. 3, slots 410 may inset into beverage holder 100, rather than extending from an outer edge of beverage holder 100 as in the case of slots 310.

Figure 5:
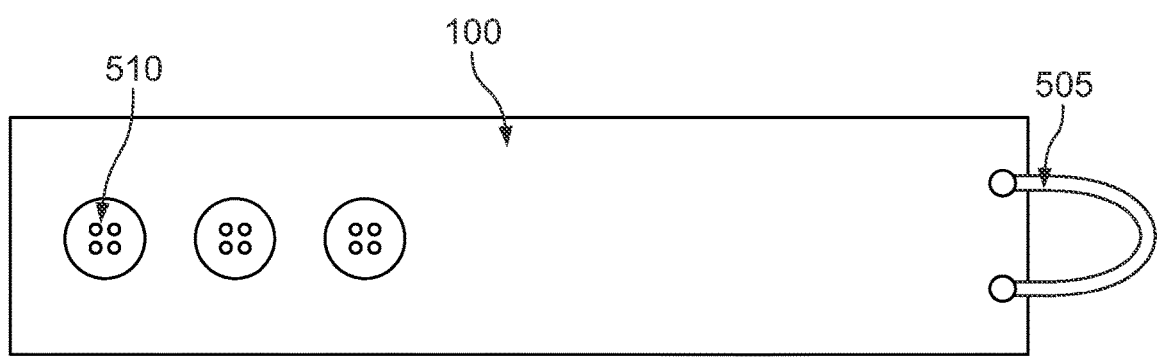
FIG. 5 shows a perspective view of an alternative improved beverage holder.

FIG. 5 shows a further optional embodiment of beverage holder 100. As shown in FIG. 5, beverage holder 100 may comprise a strap 505 and a plurality of buttons or tabs 510. As with the embodiments shown in FIGS. 3 and 5, a user may wrap beverage holder around a beverage container and attach strap 505 to a corresponding tab 510 so as to secure beverage holder 100 to the beverage container.

In use, the embodiments depicted in FIGS. 1-5 can be used to insulate a user's hand from a beverage while discouraging insects and other pests from approaching or landing on the beverage or beverage container.

In one example, during operation, a user may place a beverage holder 100 onto a beverage container 110, wherein the beverage holder 100 comprises a pest repellent. For example, the user may wrap the beverage holder (such as the embodiments shown in FIGS. 3-5) onto a frusto-conical or cylindrical beverage container. The user may attach one end of beverage holder 100 to another end, such as by attaching strap 505 to a corresponding tab 510, such that the pest repellent portion of beverage holder 100 faces outward from a beverage container. The user may then slide the beverage holder upward onto the beverage container until it reaches a fiction fit or other selected height for grasping by the user. The user may then grasp beverage holder 100 and consume a beverage within beverage container 110.

A number of embodiments have been described. Nevertheless, it will be understood that various modifications may be made without departing from the scope of the following claims.

What is claimed is:

1. A beverage sleeve adapted for attachment to a beverage container comprising:
    an annular wall having an outer surface, an inner surface shape to frictionally engage with an exterior side surface of a beverage container, and a pest repellant portion positioned to emit a pest repellant composition outwardly from the outer surface when the inner surface frictionally engages the beverage container,
    wherein the annular wall comprises a first end and a second end, the first end having a plurality of slots, and the second end having a tab configured to engage with one of the plurality of slots to secure the annular wall to the exterior side surface of the beverage container and the plurality of slots extend from an upper or lower surface of the annular wall; and
    wherein the pest repellant portion includes a pest repellant solution comprising water and at least one plant compound, said plant compound being an insect repellent, antifeedant, or oviposition deterrent.

2. The beverage sleeve of claim 1, wherein the plant compound comprises one of wintergreen, cinnamon, or peppermint extracts or oils.

3. The beverage sleeve of claim 1, wherein the pest repellent portion is inset at least partially into the annular wall.

4. The beverage sleeve of claim 1, wherein the pest repellent portion comprises a concentric ring engaged with the outer surface of the annular wall.

5. The beverage sleeve of claim 2, wherein the beverage sleeve comprises a cardboard layer having an inner surface and an outer surface.

6. The beverage sleeve of claim 3, wherein the beverage sleeve comprises a chip board portion.

* * * * *